United States Patent [19]

Brooks

[11] 3,798,379

[45] Mar. 19, 1974

[54] CONNECTOR TERMINAL DIAL REPULSER

[75] Inventor: Dell Royce Brooks, Ballinger, Tex.

[73] Assignee: Telephone Industries, Inc., Ballinger, Tex.

[22] Filed: Sept. 22, 1971

[21] Appl. No.: 182,890

[52] U.S. Cl. .......................... 179/16 E, 179/18 AD

[51] Int. Cl. .......................... H04q 1/32

[58] Field of Search ........... 179/16 EA, 16 E, 16 F, 179/41 A, 41 R, 18 AH, 18 B, 18 BE, 18 AD

[56] References Cited

UNITED STATES PATENTS

| | | | |
|---|---|---|---|
| 3,179,750 | 4/1965 | Reilly | 179/18 AH X |
| 3,306,982 | 2/1967 | Ericsson | 179/16 F |
| 3,166,642 | 1/1965 | Abbott | 179/16 E X |
| 3,663,762 | 5/1972 | Joel, Jr. | 179/41 A |
| 2,420,713 | 5/1947 | McCreary | 179/16 EA |
| 3,312,784 | 4/1967 | Draper, Jr. | 179/16 E |
| 3,188,396 | 6/1965 | MacFarlane | 179/18 AH |

FOREIGN PATENTS OR APPLICATIONS

| | | | |
|---|---|---|---|
| 1,184,648 | 3/1970 | Great Britain | 179/16 E |

*Primary Examiner*—Thomas W. Brown
*Attorney, Agent, or Firm*—Richards, Harris & Medlock

[57] ABSTRACT

A trunk circuit interface between a connector terminal of a conventional telephone switching system and a plurality of dial access stations forward of the connector terminal. A conventional repeating coil and a plurality of relays respond to ringing on the connector terminal by providing a ring-trip loop closure and a path for receiving further dial pulses. Dial pulses actuate the relays to provide loop pulsing to the forward equipment. When enough pulses have been received to select a particular station in the forward equipment, ground is provided back to the circuitry of the invention to inhibit further pulses and close a tip and ring transmission path between the output of the connector terminal and the selected station within the forward equipment.

4 Claims, 2 Drawing Figures

CONNECTOR TERMINAL DIAL REPULSER

BACKGROUND OF THE INVENTION

1. Field of the Invention

The invention relates to a trunk circuit for providing dial access to equipment beyond a telephone switching system connector terminal and, more particularly, to a circuit for dial repulsing into a selected station within equipment forward of a connector terminal.

2. History of the Prior Art

Conventional telephone company switching equipment provides subscriber dial access to a connector terminal identified by a telephone number. The terminating connector switch provides a talking path from the dialing subscriber to the equipment connected thereto, generally another subscriber, but does not have the capability of receiving battery voltgage pulses from the calling instrument and transmitting further loop closure dial pulses to the equipment forward of the connector. In certain applications, such as private automatic branch exchange (PABX) or radio common carrier telephone equipment (RCC), it is desirable to be able to dial select a station beyond the listed telephone number. One way of providing such access is by terminating the forward equipment at a conventional telephone company selector switch so that further dial pulses can be transmitted to select an individual station within the forward equipment. This solution is relatively expensive in that individual selector switches must be dedicated to the forward equipment which prevents their usage for conventional dial station selection within the central office.

Another solution for obtaining access to equipment forward of a conventional connector terminal is that of multi-frequency signaling. In this technique the forward equipment is terminated at a connector terminal and a normal dial connection is made from a calling subscriber to that terminal. A pair of tones is generated at the calling station to identify and select a particular station with the forward equipment and effect a closure of a transmission path to the selected station. This technique requires additional equipment at both originating and terminating locations to generate and receive the signaling tones. Special signaling equipment is far more expensive than station selection by dial pulses from the originating subscriber.

The present invention enables the use of additional dial pulses from an originating, subscribing station to dial directly to a station within forward equipment through a single central office connector terminal and thereby utilize only one transmission path through the telephone company equipment.

SUMMARY OF THE INVENTION

The invention relates to a dial repulsing circuit for connecting dial pulses from a telephone central office connector terminal to a dial pulse selectable station within forward equipment. The circuit includes means for tripping the ringing current applied to the connector terminals and means for completing a conductive loop from the connector terminal to the forward equipment. Dial pulses are impressed upon the connector terminal and the conductive loop is interrupted in sequence with the pulses. When the loop is connected to a station within the forward equipment a transmission path is closed from the connector terminal to the forward equipment.

BRIEF DESCRIPTION OF THE DRAWING

For a more complete understanding of the present invention and for further objects and advantages thereof, reference may now be had to the following description taken in conjunction with the accompanying drawings in which.

DETAILED DESCRIPTION

Figures 1, 2:
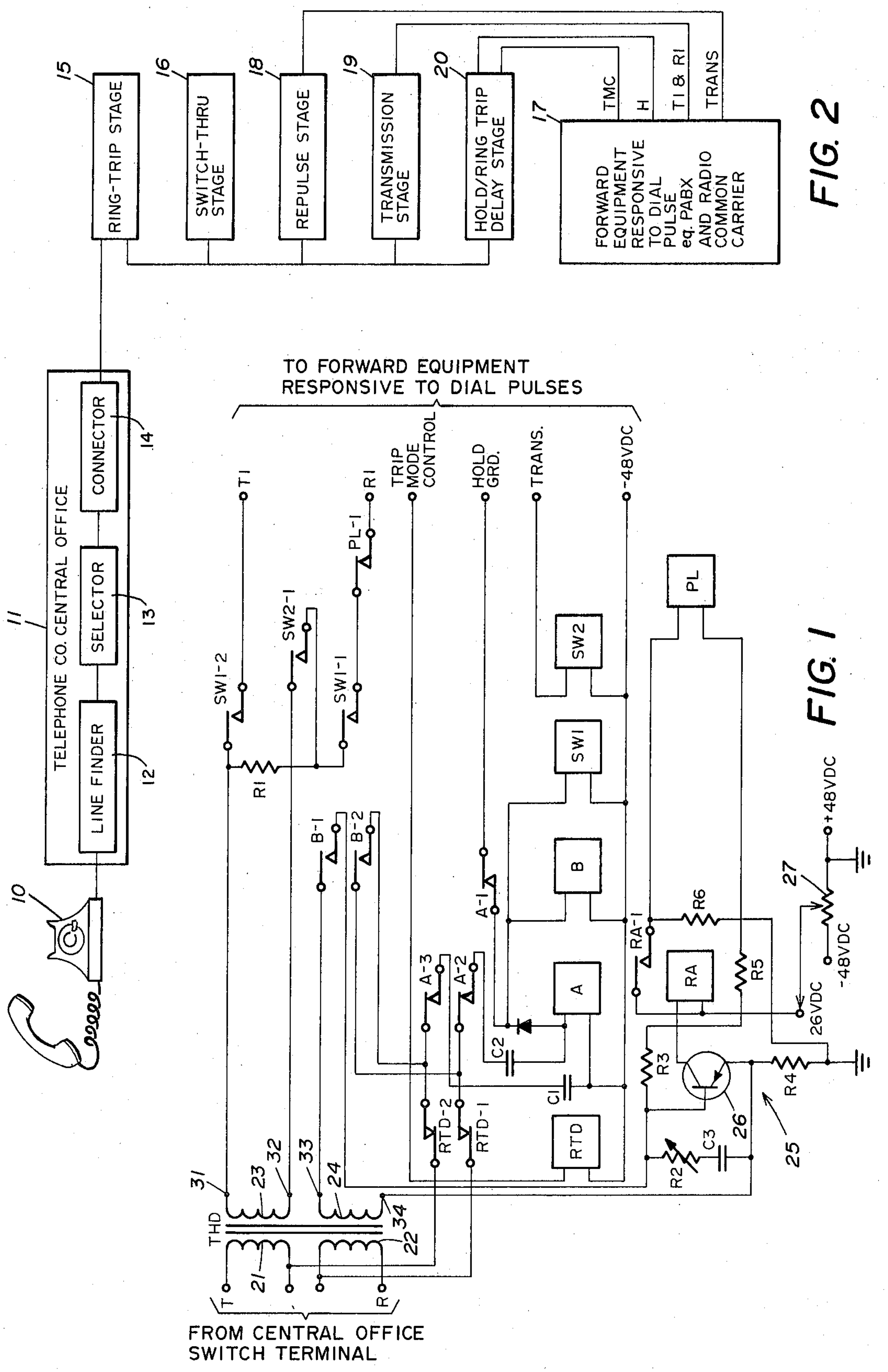
FIG. 1 is a block diagram of the dial repulsing circuit of the present invention interfaced with conventional telephone company equipment.
FIG. 2 is a schematic diagram of a circuit constructed in accordance with the invention.

As shown in FIG. 1, a dial telephone instrument 10 is connected to a conventional telephone company step-by-step central office through a line finder switch 12. The function of the line finder 12 is to locate and connect to the particular telephone instrument 10 when the receiver is lifted and then transmit the dialed digits to a plurality of selector switches 13. The subscriber dials through the selector switches 13 until he reaches the last two digits of the conventional telephone number. At that time the subscriber's line is coupled from a selector switch 13 to a connector switch 14 which responds to the final digits and connects it to a particular terminal identified by the telephone number. Each terminal on a connector switch is generally coupled to another subscriber's line and a.c. ringing current is placed thereon automatically. When the called subscriber answers his telephone instrument, the ringing is tripped and a talking path established.

The input connections to the circuitry of the present invention is terminated on a particular connector switch terminal identified by a particular telephone number. The output of the circuit leads to forward equipment within which a station is to be dial selected. Once dialing has been completed at the connector terminal, a ring-trip stage 15 within the circuitry provides a low resistance path back to the telephone instrument 10. The increased current which flows through the lower resistance trips the ringing which was placed on the line automatically when the particular connector terminal was selected. A switch-through stage 16 connects the telephone instrument 10 through to the forward equipment 17 so that a particular station within the equipment may be selected by further dialing. The forward equipment 17 may typically consist of a private automatic branch exchange (PABX) so that a particular individual station within that PABX may be dialed. Another example of forward equipment, in connection with which the circuit of the present invention may be useful, is that of a radio common carrier telephone system (RCC) wherein further dialing selects a particular mobile telephone subscriber.

Once the switch-through stage 16 is operated to provide a path from the subscriber 10 to the forward equipment 17, a dial repulse stage 18 permits the subscriber to continue dialing battery voltage dial pulses and produce loop closure dial pulses into the forward equipment 17 to select an individual station therein. After the station has been selected, which may require one or many digits, a transmission stage 19 establishes a talking path between the selected station in the forward equipment and the dialing subscriber 10. When one of the two stations hang up at the end of a conversation the circuit is cleared for further use. In the event the dialed station within the forward equipment 17 is busy, a hold/ring-trip delay stage 20 inhibits the ring trip stage 15 and the calling subscriber continues to hear ringing. After a certain time the calling subscriber will conclude that the forward equipment 17 is busy and hang up to try later.

Referring now to the schematic diagram of the circuit shown in FIG. 2, the connector terminal of the telephone company central office equipment is terminated to the input of the circuit of the invention which is the T & R terminals of a conventional, four-wire repeating coil THD. The repeating coil THD includes a pair of individual primary coils 21 and 22 and a pair of secondary coils 23 and 24 having output terminals 31 – 34. When the forward equipment is idle, a relay RTD is normally unoperated and an a.c. path is normally formed from the input coils 21 and 22 through closed contacts RTD-1 and RTD-2, contacts A-2 and A-3, and capacitors C1 and C2 to operate a relay A. Closure of the A relay connects a positive ground potential standing on the HOLD GND lead from the forward equipment through the A-1 contacts to the winding of the A relay locking it operated. Operation of the A relay also opens the contacts A-2 and A-3 to interrupt the a.c. ringing current path from the repeating coil THD.

Closure of the contacts A-1 also connects ground to the windings to operate the B and SW1 relays. Operation of the B relays closes contacts B-2 to provide a complete circuit from the T lead of repeating coil THD through contacts RTD-1 and RTD-2 back to the R lead of the repeating coil which is connected to the telephone company connector terminal equipment. Conventional telephone company ringing equipment is arranged so that when a.c. ringing current is applied to a line the resistance of the line is very high, virtually an open circuit. When the line resistance is lowered below a certain value by lifting the receiver of the ringing telephone, the a.c. ringing current is automatically removed at the central office. This is called tripping the ring. The T and R circuit closure through contacts RTD-1, B-2 and RTD-2, causes the ringing from the telephone company to trip and produces a closed loop back to the connector terminal and hold it in an answered condition.

Operation of relay SW1 close contacts SW1-1 and SW1-2 to connect a loop pulsing path through resistor R1 and the normally closed contacts PL-1 to the T1 and R1 leads to the forward equipment. The resistor R1 may be of different values depending upon the impedance of the forward equipment looking back into the T1 and R1 leads. The resistance of R1 is chosen to match that of the line to the forward equipment, and may be typically on the order of 600–900 ohms. Closure of the B-1 contact connects to the coil 24 of the THD repeating coil to the input of a pulse control circuit 25 through a variable resistor R2 and a capacitor C3.

After the operation of the RTD, A, B and SW1 relays to trip the ring, complete a dialing path to the T1 and R1 leads and energize the pulse control circuit, the dial repulser circuit of the invention is ready to receive further dial pulses to select a particular station within the forward equipment.

When additional dial pulses from the calling telephone are impressed through the THD repeating coil upon the coil 24, a transistor 26 within the pulse control circuit 25 is alternately placed into and out of conduction to be responsive to and follow the dial pulses. The generated output current pulses from the transistor 26 operates a relay RA to alternately open and close the contacts RA-1. This alternate closure is used to actuate the PL relay which opens and closes the PL-1 contacts and provides loop closure pulses through contacts SW-1 and SW1-2 out onto the T1 and R1 leads to the forward equipment.

The length of time that the relay RA remains closed in response to each one of the dial pulses received on the T and R leads can be varied by adjustment of the values of the potentiometer 27 and the variable resistor R2.

After the forward equipment has been stepped to the point of connection to an individual station, a ground signal is returned on the TRANS lead to operate the SW2 relay. Closure of the SW2-1 contacts connects a transmission path from the coil 23 of the THD repeating coil out through contacts SW1-1, SW1-2 and PL-1 to the T-1 and R-1 leads to the forward equipment.

At the end of the conversation or data transmission, the positive potential on the HOLD GND lead from the forward equipment is removed for approximately one half second while ground on the TRANS lead is removed completely. Interruption of ground on the HOLD GND lead releases the a relay which opens contacts A-1 to release the B and SW1 relays. Removal of ground from the TRANS lead releases the SW2 relay and the circuit is ready for receipt of another call.

When the forward equipment is busy, a ground is supplied from the forward equipment over the TRIP MODE CONTROL lead to actuate the RTD relay and open contacts RTD-1 and RTD-2. If a calling subscriber is connected to the T and R leads of the THD repeating coil while the forward equipment is busy the open RTD-1 and RTD-2 contacts permit the ringing to continue without interruption until the caller concludes from the unusual time delay in reaching the party that the line is busy. When the forward equipment becomes idle, the ground on the TRIP MODE CONTROL lead is released allowing the RTD-1 and RTD-2 contacts to close in preparation for receipt of another call.

In operation a calling subscriber reaches the connector terminal assigned to the circuit of the invention, ringing current is applied to the T and R leads of the THD repeating coil. The a.c. ringing current is passed through the RTD-1 and RTD-2 contacts, the A-2 and A-3 contacts and is partially rectified by the capacitors C1 and C2 to actuate the A relay. Operation of the A relay closes a path through the A-1 contacts and the HOLD GND lead to operate the B and SW1 relays and trip the ringing current due to a loop closure through contacts B-2 back to the T and R leads. Closure of the B-1 contact connects the calling subscriber's line to the pulse control circuit 25 which receives further dial pulses. The pulse control circuit 25 repulses the dialed information out to the forward equipment through relays RA and PL and a matched impedance path via the SW1-1, SW1-2, and PL-1 contacts.

When a sufficient number of digits have been dialed to actuate a particular station within the forward equipment a ground signal is returned on the TRANS lead. The ground operates the SW2 relay to close a transmission path from the T and R leads toward the forward equipment. Disconnection of the calling subscriber from the forward equipment removes the signal on the HOLD GND and TRANS lead to release the A, B, SW1 and SW2 relays and ready the circuit for further operation with the next call.

In summary, it can be seen that the operation of the connector terminal dial repulser of the invention serves to provide an efficient, inexpensive means of dial selecting a station within equipment forward of a central office connector switch. The repulser circuit provides ring trip to a connector terminal and loop closure dial pulses into the forward equipment. Once the forward station is dial selected, the circuit closes a transmission path from the calling station, through the connector terminal and repulser circuit to the selected station.

Having described the invention in connection with certain specific embodiments thereof, it is to be understood that further modifications may now suggest themselves to those skilled in the art and it is intended to cover such modifications as fall within the scope of the appended claims.

What is claimed is:

1. A dial repulser circuit for directing dial pulses from a telephone central office connector terminal to a dial pulse selectable station within forward equipment, comprising;

a repeating coil having a plurality of input terminals connected to the output of said connector terminal and also having a plurality of output terminals;

a first relay connected to one of said output terminals of said coil and responsive to a.c. ringing current thereon for closing a conductive path through said coil and tripping the ring current;

a second relay responsive to operation of said first relay for closing a conductive loop to the forward equipment;

a current generator responsive to dial pulses for producing corresponding current pulses;

a third relay responsive to operation of said first relay for connecting one of said output terminals of said coil to said current generator;

a fourth relay connecting to said current generator having a normally closed contact in said conductive loop for providing loop interruption in response to current pulses;

a fifth relay responsive to connection to said conductive loop to a station in said forward equipment for closing a transmission path from said connector to the station in said forward equipment.

2. A dial repulser circuit as set forth in claim 1 wherein said current generator includes a transistor.

3. A dial repulser circuit as set forth in claim 1 which also includes means responsive to a release signal from the forward equipment for releasing said first, second, third and fifth relays.

4. A dial repulser circuit as set forth in claim 1 which also includes:

means responsive to a busy condition within said forward equipment for inhibiting the operation of said first relay and preventing the ringing current from being tripped.

* * * * *